US011058102B2

(12) United States Patent
Ferger et al.

(10) Patent No.: US 11,058,102 B2
(45) Date of Patent: Jul. 13, 2021

(54) ANGLING SYSTEM

(71) Applicant: New Direction Tackle Ltd., Eastleigh (GB)

(72) Inventors: Benjamin Ferger, Dillenburg (DE); Ke Yan, Ningbo Zhejiang (CN)

(73) Assignee: NEW DIRECTION TACKLE LTD., Eastleigh (GB)

( * ) Notice: Subject to any disclaimer, the term of this patent is extended or adjusted under 35 U.S.C. 154(b) by 17 days.

(21) Appl. No.: 16/402,533

(22) Filed: May 3, 2019

(65) Prior Publication Data

US 2020/0260709 A1   Aug. 20, 2020

(30) Foreign Application Priority Data

Feb. 15, 2019   (EP) ..................................... 19157395

(51) Int. Cl.
*H04B 7/00* (2006.01)
*A01K 97/12* (2006.01)
(Continued)

(52) U.S. Cl.
CPC .............. *A01K 97/125* (2013.01); *G08B 7/06* (2013.01); *G08B 21/182* (2013.01); *H04B 1/385* (2013.01); *H04W 76/14* (2018.02)

(58) Field of Classification Search
CPC ......... H04W 76/14; H04B 1/385; G08B 7/06; G08B 21/182
(Continued)

(56) References Cited

U.S. PATENT DOCUMENTS

4,625,446 A * 12/1986 Morimoto ............ A01K 97/125
  43/17
4,901,291 A *  2/1990 Kurata .................... G01S 7/003
  367/111
(Continued)

*Primary Examiner* — April G Gonzales
(74) *Attorney, Agent, or Firm* — Tarolli, Sundheim, Covell & Tummino LLP (57) ABSTRACT

An angling system comprising a wearable band and at least one detector selected from: at least one fish bite detector, wherein the or each fish bite detector comprises a fish bite sensor connected to a transceiver, and wherein the or each fish bite detector is configured to transmit a signal upon the fish bite sensor detecting a fish bite; and a motion detector, wherein the motion detector comprises a motion sensor connected to a transceiver, and wherein the motion detector is configured to transmit a signal upon the motion sensor detecting motion, wherein the wearable band comprises: at least one strap; and a wireless communication unit, wherein the wireless communication unit is attached or attachable to the at least one strap, wherein the wireless communication unit comprises a transceiver, at least one actuator, and at least one of a haptic actuator connected to the transceiver and an alarm connected to the transceiver, wherein the transceiver of the wireless communication unit is pairable with the transceiver of the or each at least one detector using the at least one actuator, wherein the transceiver of the wireless communication unit is configured to receive signals transmitted by each paired at least one detector, and wherein reception of each signal causes the haptic actuator, if present, to vibrate and the alarm, if present, to sound.

15 Claims, 4 Drawing Sheets

(51) Int. Cl.
*H04W 76/14* (2018.01)
*G08B 7/06* (2006.01)
*G08B 21/18* (2006.01)
*H04B 1/3827* (2015.01)

(58) Field of Classification Search
USPC .................................................. 455/41.2
See application file for complete search history.

(56) References Cited

U.S. PATENT DOCUMENTS

| | | | | |
|---|---|---|---|---|
| 5,208,790 | A * | 5/1993 | Sato | G04G 9/0076 |
| | | | | 368/15 |
| 5,228,228 | A * | 7/1993 | Meissner | A01K 97/125 |
| | | | | 43/17 |
| 5,586,402 | A * | 12/1996 | Brent | A01K 97/12 |
| | | | | 43/17 |
| 6,035,573 | A * | 3/2000 | Flores | A01K 97/125 |
| | | | | 43/17 |
| 6,487,812 | B2 * | 12/2002 | Johnson | A01K 97/01 |
| | | | | 43/17 |
| 6,519,893 | B2 * | 2/2003 | Shook | A01K 97/01 |
| | | | | 43/17 |
| 6,708,441 | B2 * | 3/2004 | Dirito | A01K 97/125 |
| | | | | 43/17 |
| 6,807,766 | B1 * | 10/2004 | Hughes | A61F 5/48 |
| | | | | 43/17.1 |
| 6,910,895 | B1 * | 6/2005 | Gevedon | G09B 19/00 |
| | | | | 434/247 |
| 6,938,367 | B2 * | 9/2005 | Cameron | A01K 97/125 |
| | | | | 43/17 |
| 7,043,867 | B1 * | 5/2006 | Fox | A01K 97/125 |
| | | | | 43/17 |
| 7,523,882 | B2 * | 4/2009 | Priednieks | A01K 97/125 |
| | | | | 242/224 |
| 7,845,106 | B2 * | 12/2010 | Norman | A01K 97/10 |
| | | | | 43/21.2 |
| 8,336,248 | B2 * | 12/2012 | Miškatovi | A01K 97/125 |
| | | | | 43/17 |
| 8,896,450 | B1 * | 11/2014 | Overbye | A01K 97/125 |
| | | | | 340/573.1 |
| 9,055,736 | B1 * | 6/2015 | DeLucca | A01K 93/02 |
| 9,420,774 | B1 * | 8/2016 | Antonio | A01K 97/125 |
| 2002/0066221 | A1 * | 6/2002 | Johnson | A01K 97/01 |
| | | | | 43/17 |
| 2004/0105343 | A1 * | 6/2004 | Betts | G01V 1/38 |
| | | | | 367/99 |
| 2007/0058489 | A1 * | 3/2007 | Bratcher | A01K 85/00 |
| | | | | 367/111 |
| 2016/0007581 | A1 * | 1/2016 | Davidson | A01K 85/01 |
| | | | | 43/17.1 |
| 2016/0113262 | A1 * | 4/2016 | Scott | A01K 97/06 |
| | | | | 224/219 |
| 2018/0122269 | A1 * | 5/2018 | Pacchione | G09B 5/125 |
| 2018/0367658 | A1 * | 12/2018 | Endo | H04M 1/72412 |

* cited by examiner

ANGLING SYSTEM

RELATED APPLICATIONS

The present application claims priority to European Patent Application No. 19157395.5, filed 15 Feb. 2019, the content of which is incorporated herein by reference in its entirety.

The present invention relates to an angling system, in particular an angling system comprising a wearable band and at least one detector. Especially, the at least one detector is selected from at least one fish bite detector and a motion detector.

Fish bite detectors, devices which are couplable to fishing lines to detect movement of the fishing line indicative of a fish bite, are well known in the art and commonly used in carp fishing. Such detectors generally comprise an alarm which sounds upon detection of movement of the fishing line indicative of a fish bite. Some fish bite detectors comprise an illumination means which lights up upon detection of a fish bite. The user of the fish bite detector is alerted to a potential fish bite by the alarm and/or the illumination means and can check the fishing line coupled to the fish bite detector for a catch. Fish bite detectors allow anglers to set up their fishing equipment and be alerted to fish bites without the need to constantly monitor movement of the fishing line.

A fish bite detector comprising an alarm is disclosed in EP1147704. A fish bite detector comprising an illumination means is disclosed in EP2147596.

Motion detectors, otherwise known as anti-theft alarms, are known in the art. Such detectors comprise a sensor, such as a passive infrared sensor (PIR), for detecting heat and/or movement indicative of the presence of a person in the vicinity of the detector. The sensor is connected to an alarm which sounds upon the detection of heat and/or movement indicative of the presence of a person. The alarm of the motion detector acts to deter potential thieves and also notifies the user to check their belongings near to the detector. Motion detectors are commonly used by anglers to protect their fishing equipment. Motion detectors are particularly useful for night time fishing when the angler may be sleeping and when visibility is reduced.

The disadvantage of fish bite detectors and motion detectors known in the art is that the user generally must stay within the hearing range of the alarm for the detector to be of use. Furthermore, it is difficult for the user to use multiple detectors simultaneously. Firstly, when using multiple detectors, it is unlikely that the user will be within hearing range of all detectors simultaneously and secondly, it is difficult for the user to distinguish from which of the multiple detectors an alarm sound originates, particularly if the user is using multiple of the same type of fish bite detector having the same alarm.

The present invention encompasses an angling system comprising a wearable band having a wireless communication unit, and at least one detector selected from at least one fish bite detector and a motion detector. The wireless communication unit of the present invention comprises either an alarm or a haptic actuator or both and is pairable with the or each at least one detector.

The or each at least one detector is configured to transmit a signal upon detection of a fish bite or detection of motion. The wireless communication unit is configured to receive signals transmitted by the or each paired detector and for the alarm to sound and/or the haptic actuator to vibrate upon receipt of each of said signals. The user of the wearable band is therefore alerted to the detection of fish bites or the detection of motion by the or each paired detector. The user does not need to be close to the or each paired detector to be alerted to the detection of fish bites or motion by the detector.

Advantageously, the inventive angling system may comprise an LED indicator for notifying the user of the wearable band from which of the at least one detectors the fish bite or motion signal was received.

According to the present invention there is provided an angling system comprising a wearable band and at least one detector selected from:

at least one fish bite detector, one fish bite detector, wherein the or each fish bite detector comprises a fish bite sensor connected to a transceiver, and wherein the or each fish bite detector is configured to transmit a signal upon the fish bite sensor detecting a fish bite; and a motion detector, wherein the motion detector comprises a motion sensor connected to a transceiver, and wherein the motion detector is configured to transmit a signal upon the motion sensor detecting motion, wherein the wearable band comprises:

at least one strap; and a wireless communication unit, wherein the wireless communication unit is attached or attachable to the at least one strap, wherein the wireless communication unit comprises a transceiver, at least one actuator, and at least one of a haptic actuator connected to the transceiver and an alarm connected to the transceiver, wherein the transceiver of the wireless communication unit is pairable with the transceiver of the or each at least one detector using the at least one actuator, wherein the transceiver of the wireless communication unit is configured to receive signals transmitted by each paired at least one detector, and wherein reception of each signal causes the haptic actuator, if present, to vibrate and the alarm, if present, to sound.

Preferably, the system further comprises a head torch, wherein the head torch comprises an illumination means connected to a transceiver, wherein the transceiver of the wireless communication unit is pairable with the transceiver of the head torch using the at least actuator, wherein, when the transceiver of the head torch and the transceiver of the wireless communication device are paired, the at least one actuator is manipulable by the user to cause an on/off signal to be transmitted from the transceiver of the wireless communication unit to the transceiver of the head torch, and wherein the receipt of an on/off signal from the wireless communication unit by the transceiver of the head torch causes the illumination means to be switched on or off.

Advantageously, the wireless communication unit further comprises a LED connected to the transceiver, wherein the LED is configured to light up upon receipt by said transceiver of each signal transmitted by each paired at least one detector.

Conveniently, the LED is a RGB LED.

Preferably, the system comprises more than one detector, wherein the RGB LED is configured to light up a first colour upon receipt by the transceiver of the wireless communication unit of signals from a first paired detector, wherein the RGB LED is configured to light up a second colour upon receipt by the transceiver of the wireless communication unit of signals from a second paired detector, and so on with each paired detector being associated with a different colour of the RGB LED.

Advantageously, the at least one actuator is manipulable to select which colour of the RGB LED is associated with each paired detector.

Conveniently, the wireless communication unit comprises a rechargeable battery, wherein the at least one actuator is manipulable to cause the RGB LED to illuminate, and wherein the colour of the RGB LED when lit is determined by and indicative of the percentage charge of the rechargeable battery.

Preferably, the wireless communication unit comprises a rechargeable battery, wherein the LED is configured to flash when the percentage charge of the rechargeable battery falls below 20%, more preferably when the percentage charge of the rechargeable battery falls below 10%.

Advantageously, each at least one detector and the head torch, if present, is configured to transmit a pairing signal to the transceiver of the wireless communication unit upon successful pairing with the transceiver of the wireless communication unit, wherein the LED is configured to light up upon receipt by the transceiver of the wireless communication unit of the pairing signal.

Conveniently, the or each at least one detector and the head torch, if present, comprises at least one actuator manipulable by the user to pair the transceiver of the detector or the transceiver of the head torch with the transceiver of the wireless communication unit.

Preferably, the wearable band is a wristband.

Advantageously, the wearable band is water resistant.

Conveniently, the at least one actuator of the wireless communication unit is configured for switching the wireless communication unit on and off.

Preferably, the wireless communication unit comprises a rechargeable battery connected to a charging port and preferably wherein the system further comprises a charger.

According to the present invention there is also provided a method of pairing a wireless communication unit with a detector selected from a fish bite detector and a motion detector, wherein the wireless communication unit comprises at least one actuator and a RGB LED and wherein the detector also comprises at least one actuator, comprising:
manipulating the at least one actuator of the wireless communication unit to enter a pairing mode of the wireless communication unit;
further manipulating the at least one actuator of the wireless communication unit to illuminate the RGB LED;
optionally, repeatedly manipulating the at least one actuator of the wireless communication unit to cycle through the colours of illumination of the RGB LED, wherein each manipulation of the at least one actuator changes the colour of illumination of the RGB LED;
selecting a colour of the RGB LED for association with the detector, wherein the selecting comprises manipulation of the at least one actuator of the wireless communication unit and wherein the selected colour is the colour of illumination of the RGB LED at the time of said manipulation of the at least one actuator; and
manipulating the at least one actuator of the detector to complete pairing of the wireless communication unit with the detector, wherein upon successful pairing the RGB LED illuminates, preferably wherein the RGB illuminates the selected colour.

According to the present invention there is further provided a method of fish bite and/or motion detection comprising;
coupling at least one fish bite detector comprising a transceiver to respectively at least one fishing line, and/or placing a motion detector comprising a transceiver in an area wherein the detection of motion is desired;
pairing the transceiver of the or each at least one fish bite detector and/or the transceiver of the motion detector with a transceiver of a wireless communication unit of a wearable band, wherein the wireless communication unit comprises at least one of a haptic actuator and an alarm; and
detecting fish bites and/or motions, wherein the transceiver of the or each at least one fish bite detector transmits a signal to the transceiver of the wireless communication unit upon the fish bite detector detecting a fish bite and/or wherein the transceiver of the motion detector transmits a signal to the transceiver of the wireless communication unit upon the motion detector detecting motion, and wherein the haptic actuator is configured to vibrate and/or the alarm is configured to sound upon reception by the transceiver of the wireless communication unit of each signal transmitted by the or each at least one fish bite detector and/or the motion detector.

The invention will now be described with reference to the attached drawings, in which.

Figure 1:
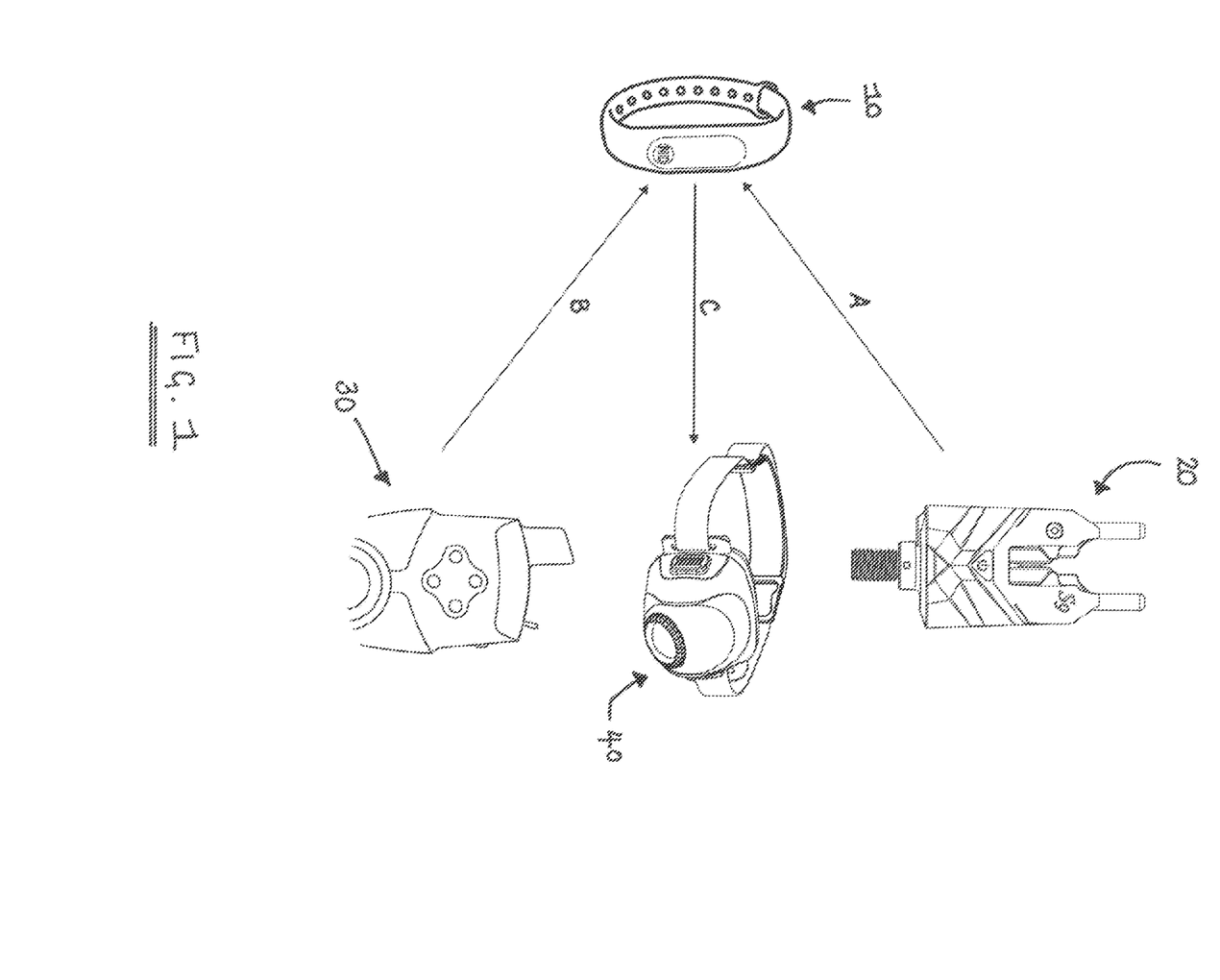
FIG. 1 is a perspective view of an angling system according to the invention. The arrows labelled with letters in FIG. 1 represent wireless signals.

FIG. 1 depicts generally a system according to the present invention. The system necessarily comprises a wearable band 10 and at least one detector 20, 30 selected from at least one fish bite detector 20 and a motion detector 30. In some arrangements, the system comprises a plurality of fish bite detectors 20. In a preferred arrangement, the system comprises up to five fish bite detectors 20. In some arrangements, the system comprises both at least one fish bite detector 20 and a motion detector 30. In some arrangements, the system further comprises a head torch 40.

Figure 2A:
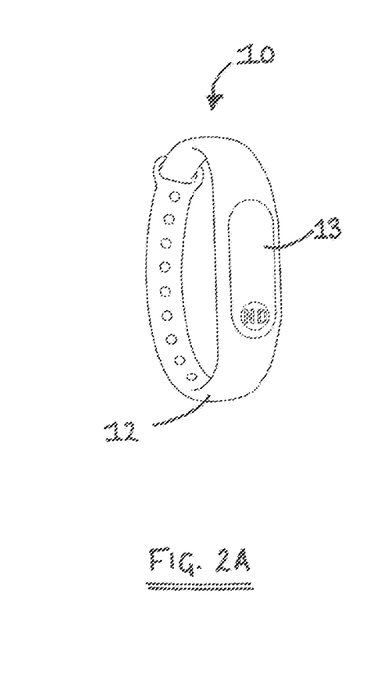
FIG. 2A is a perspective view of a wearable band of according to the invention.
Figure 2B:
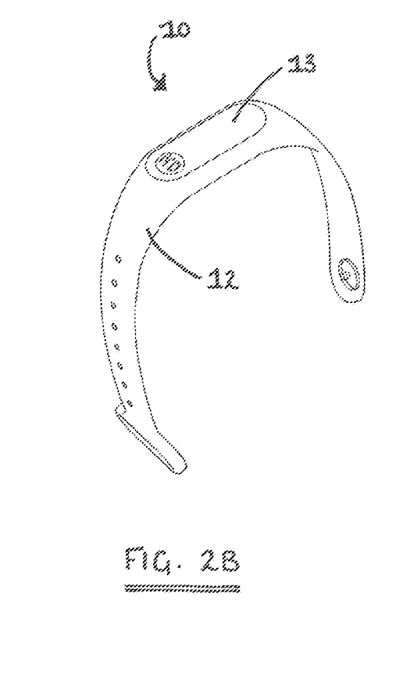
FIG. 2B is a further perspective view of the wearable band of FIG. 2A.

FIGS. 2A and 2B depict a wearable band 10 according to the invention. The wearable band 10 comprises at least one strap 12 and a wireless communication unit 13.

Figure 3:
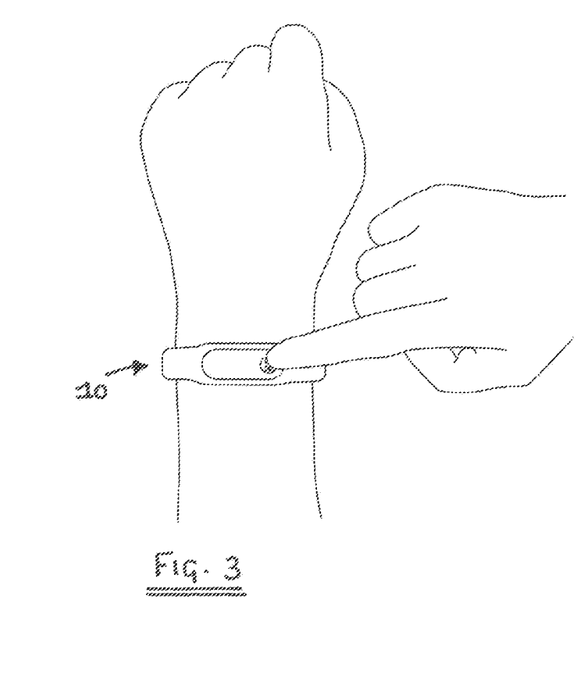
FIG. 3 depicts a wearable band according to the invention in use.

In a preferred arrangement, the wearable band 10 is a wristband, as is depicted in FIG. 3. Alternative arrangements, wherein the wearable band 10 is not a wristband, are also envisaged, such as a necklace or a lanyard arrangement.

In some arrangements, the wireless communication unit 13 is attached to the at least one strap 12 of the wearable band 10. In a preferred arrangement, the wireless communication unit 13 is attachable to and detachable from the at least one strap 12. The at least one strap 12 may clip onto the wireless communication unit 13. The at least one strap 12 may comprise an aperture or recess configured to receive the wireless communication unit 13.

The wearable band 10 depicted in FIGS. 2A and 2B comprises a single strap 12. It can be appreciated that, in alternative arrangements, the wearable band 10 may comprise two straps 12.

The at least one strap 12 in FIGS. 2A and 2B additionally comprises a pin and a series of pin apertures configured for receiving said pin. The user can affix the two ends of the at least one strap 12 together by way of the pin and series of pin apertures. This enables the wearable band 10 to be worn by the user. It can be appreciated that other means for affixing the two ends of the at least one strap 12 together are also envisaged. It can also be appreciated that, in arrangements comprising a single strap 12, the strap may form a complete loop. In such arrangements, no affixing means is required.

Figure 4A:
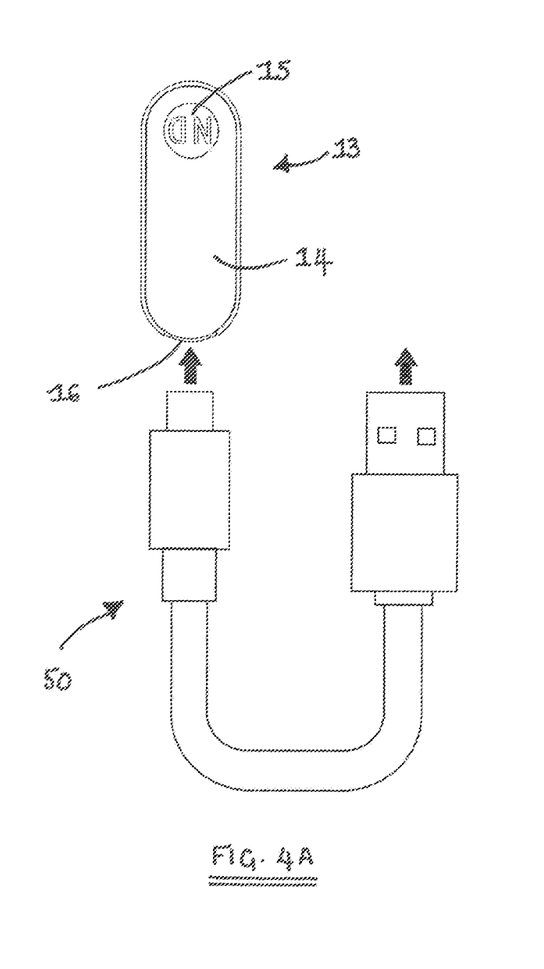
FIG. 4A is a perspective view of a wireless communication unit according to the invention.
Figure 4B:
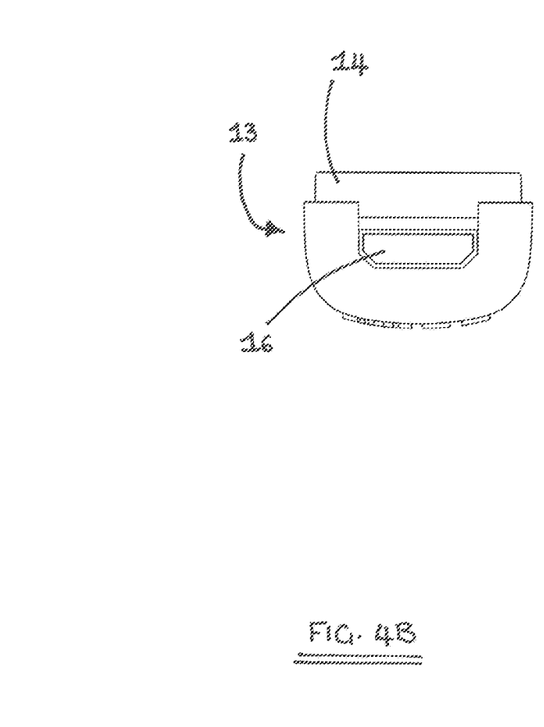
FIG. 4B is a further perspective view of the wireless communication unit of FIG. 4A.
Figure 5:
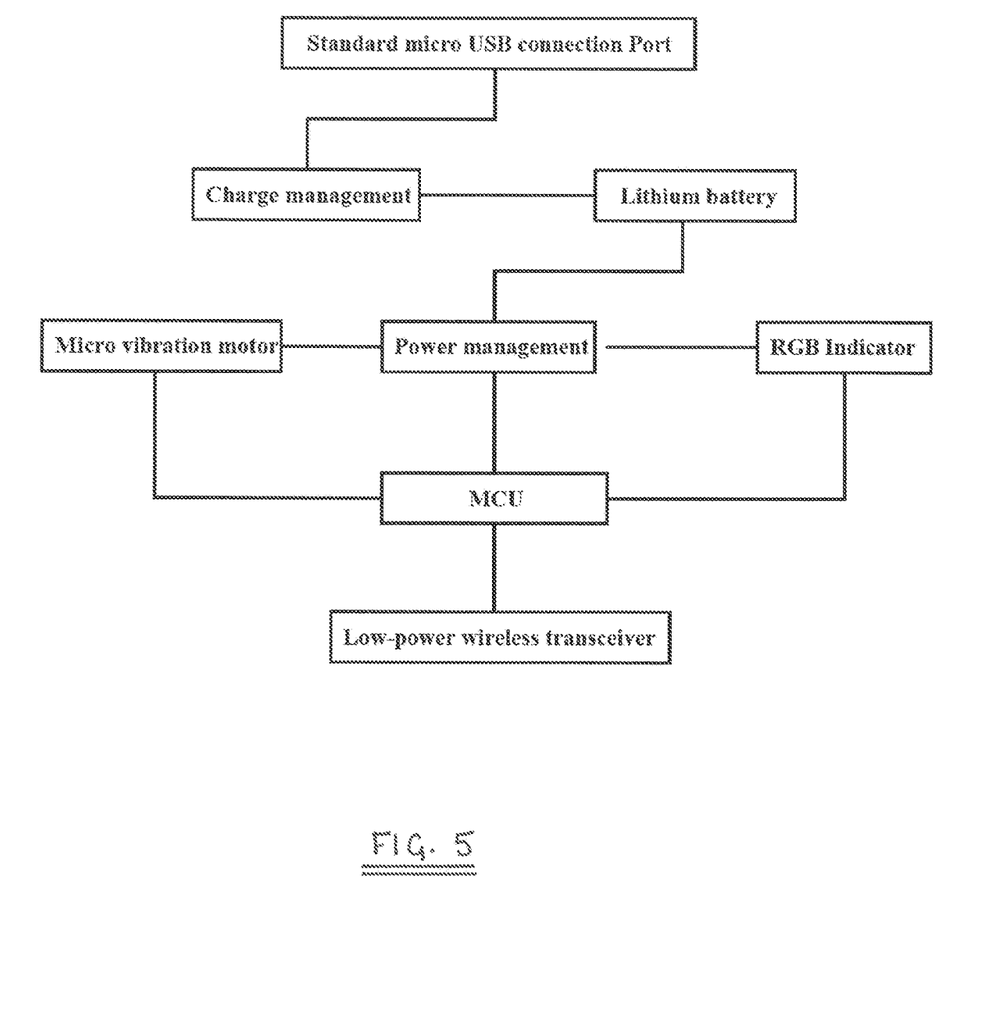
FIG. 5 shows, in diagrammatic form, the electrical circuitry of a wireless communication unit according to the invention.

FIGS. 4A and 4B depict a wireless communication unit 13 according to the present invention. It can be seen, in FIG. 4B, that the wireless communication unit 13 may comprise a charging port 16. In a preferred arrangement, the wireless communication unit 13 comprises a rechargeable battery and a charging port 16 for connecting a charger 50 to recharge the rechargeable battery of the wireless communication unit. It can be appreciated that the angling system may additionally comprise a charger 50 for charging the wireless communication unit 13. It can also be appreciated that, in alternative arrangements of the invention, the wireless communication unit 13 may be powered by one or more non-rechargeable batteries.

The wireless communication unit 13 comprises a transceiver and at least one from a haptic actuator and an alarm. The at least one from a haptic actuator and an alarm is connected to the transceiver of the wireless communication unit.

In arrangements of the angling system comprising at least one fish bite detector 20, the or each fish bite detector comprises a transceiver connected to a fish bite sensor. The or each fish bite detector 20 is configured such that the transceiver of the fish bite detector transmits a signal upon the fish bite sensor detecting a fish bite.

In arrangements of the angling system comprising a motion detector 30, the motion detector comprises a transceiver connected to a motion sensor, such as a PIR sensor. The motion detector 30 is configured such that the transceiver of the motion detector transmits a signal upon the motion sensor detecting motion.

The transceiver of the wireless communication unit 13 is pairable with the transceiver of the or each at least one detector 20, 30. In arrangements of the invention comprising a plurality of fish bite detectors 20, the transceiver of the wireless communication unit 13 may simultaneously be paired with multiple or all transceivers of the plurality of fish bite detectors 20. In arrangements comprising at least one fish bite detector 20 and a motion detector 30, the transceiver of the wireless communication unit 13 may simultaneously be paired with one or more transceivers of the at least on fish bite detector 20 and the transceiver of the motion detector 30.

Once the transceiver of the wireless communication unit 13 is paired with the transceiver of a fish bite detector 20, the transceiver of the wireless communication unit can receive signals transmitted by the transceiver of said fish bite detector. If a fish bite is detected by the fish bite sensor of the fish bite detector 20, a signal will be transmitted from the transceiver of the fish bite detector to the transceiver of the wireless communication unit 13. Arrow A in FIG. 1 represents a fish bite signal being transmitted from the transceiver of a paired fish bite detector 20 to the transceiver of the wireless communication unit 13.

Similarly, once the transceiver of the wireless communication unit 13 is paired with the transceiver of a motion detector 30, the transceiver of the wireless communication unit can receive signals transmitted by the transceiver of said motion detector. If motion is detected by the motion sensor of the motion detector 30, a signal will be transmitted from the transceiver of the motion detector to the transceiver of the wireless communication unit 13. Arrow B in FIG. 1 represents a motion detection signal being transmitted from the transceiver of a paired motion detector 30 to the transceiver of the wireless communication unit 13.

In arrangements of the wireless communication unit 13 comprising a haptic actuator, the wireless communication unit is configured such that the receipt, by the transceiver of the wireless communication unit, of a fish bite signal from a paired fish bite detector 20 or a motion detection signal from a paired motion detector 30 causes the haptic actuator to vibrate. In arrangements of the wireless communication unit 13 comprising an alarm, the wireless communication unit is configured such that the receipt, by the transceiver of the wireless communication unit, of a fish bite signal from a paired fish bite detector 20 or a motion detection signal from a paired motion detector 30 causes the alarm to sound. The vibration from the haptic actuator and/or the sound of the alarm alerts the user of the wearable band 10 to the detection of a fish bite or of a motion. In the case where a fish bite is detected, the user of the wearable band is notified to check the fishing line to which the fish bite detector 20, from which the fish bite signal originated, is coupled for a catch. In the case where a motion is detected, the user of the wearable band is notified to check their belongings in the vicinity of the motion detector 30.

It can be appreciated that the wearable band 10 increases the usefulness of a motion detector 30 and a fish bite detector 20. The user of the wearable band 10 may move away from a paired fish bite detector 20, outside of the range within which the alarm of the fish bite detector may be heard, and still be alerted to the detection of a fish bite. Similarly, the user of the wearable band 10, may move away from a paired motion detector 30, outside of the range within which the alarm of the motion detector may be heard, and still be alerted to the detection of motion in the vicinity of the motion detector.

It can be appreciated that arrangements of the wireless communication unit 13 comprising an alarm are advantageous in instances where the user of the wearable band 10 is not wearing the wearable band. The user will still hear the alarm, even if they are not wearing the wearing the wearable band 10, as long as the wearable band is within hearing range.

It can also be appreciated that arrangements of the wireless communication unit 13 comprising a haptic actuator are advantageous in instances where the user may not hear an alarm. For example, a haptic actuator is advantageous when the user is in a noisy environment.

In arrangements of the wireless communication unit 13 comprising both an alarm and a haptic actuator, the wireless communication unit may be configured such that the user may switch off or on the alarm or haptic actuator. In such arrangements the user may select whether only the haptic actuator should vibrate, only the alarm should sound, or both vibration of the haptic actuator and sounding of the alarm should occur upon receipt of a fish bite or motion detection signal by the transceiver of the wireless communication unit 13.

In arrangements of the wireless communication unit 13 comprising a haptic actuator, the wireless communication unit may be configured such that the user can adjust the intensity of the vibration of the haptic actuator. In arrangements of the wireless communication unit 13 comprising an alarm, the wireless communication unit may be configured such that the user can adjust the volume of the alarm. It can be appreciated that adjustability of the volume of the alarm and/or the intensity of vibration of the haptic actuator is advantageous. For example, the user may require a more intense vibration and/or louder alarm when sleeping than when awake.

The wireless communication unit 13 comprises at least one actuator 15, such as a button, dial or a switch. In a preferred embodiment, as depicted in FIG. 4A, the at least one actuator 15 is a single button.

The at least one actuator 15 may be manipulable by the user to switch the wireless communication unit 13 on and off.

The at least one actuator 15 may be manipulable by the user to adjust the intensity of vibration of the haptic actuator and/or the volume of the alarm.

The at least one actuator 15 is manipulable by the user to pair, to initiate pairing, or to complete pairing of the transceiver of the wireless communication unit 13 with the transceiver of the or each at least one detector 20, 30 of the angling system. In a preferred arrangement of the invention, the or each at least one detector 20, 30 of the angling system further comprises at least one actuator manipulable by the user to initiate pairing or to complete pairing of the transceiver of the wireless communication unit 13 with the transceiver of the detector.

The angling system may further comprise a head torch 40 as depicted in FIG. 1. The head torch 40 comprises a transceiver connected to an illumination means. The transceiver of the wireless communication unit 13 is pairable with the transceiver of the head torch 40. The at least one actuator 15 of the wireless communication unit 13 may be manipulable by the user to pair, to initiate pairing, or to complete pairing of the transceiver of the wireless communication unit with the transceiver of the head torch 40. In a preferred arrangement of the invention the head torch 40 further comprises at least one actuator manipulable by the user to initiate pairing or to complete pairing of the transceiver of the wireless communication unit 13 with the transceiver of the head torch.

Once paired to the transceiver of the wireless communication unit 13, the transceiver of the head torch 40 can receive signals transmitted by the transceiver of the wireless communication unit. The at least one actuator 15 of a wireless communication unit 13 may be manipulable by the user to cause an on/off signal to be transmitted from the transceiver of the wireless communication unit to the transceiver of a paired head torch 40. Such a signal is represented by arrow C in FIG. 1. The head torch 40 is configured such that the receipt of an on/off signal from the transceiver of the wireless communication unit 13 by the transceiver of the head torch causes the illumination means of the head torch to switch state from either off to on or on to off.

It can be appreciated that the illumination means of a paired head torch 40 is more readily switched off and on while the head torch is on the head of the user using the wearable band 10.

In preferred arrangements, as depicted in FIGS. 4A and 4B, the wireless communication unit 13 further comprises an LED 14 connected to the transceiver. In some arrangements, the LED 14 is configured to light up upon receipt by the transceiver of the wireless communication unit 13 of a fish bite signal from the transceiver of a paired fish bite detector 20 or of a motion detection signal from the transceiver of a paired motion detector 30. It can be appreciated that the lighting up of the LED 14 further alerts the user of the wearable band 10 to the detection of a fish bite or the detection of motion.

In a preferred arrangement, the transceiver of the or each detector 20, 30 and the head torch 40, if present, is configured to transmit a pairing signal to the transceiver of the wireless communication unit 13 upon successful pairing. The LED 14 is configured to light up upon receipt by the transceiver of the wireless communication unit 13 of a pairing signal from the transceiver of a detector 20, 30 or head torch 40. It can be appreciated that the illumination of the LED 14 notifies the user of the wearable band 10 that the transceiver of the wireless communication unit 13 has successfully paired with the transceiver of the detector 20, 30 or the head torch 40.

It can be appreciated that, in arrangements of the invention wherein the wireless communication unit 13 comprises an alarm, the alarm may be configured to sound upon receipt of by the transceiver of the wireless communication unit of a pairing signal. It can also be appreciated that, in arrangements of the invention wherein the wireless communication unit 13 comprises a haptic actuator, the haptic actuator may be configured to vibrate upon receipt of by the transceiver of the wireless communication unit of a pairing signal.

In a preferred arrangement of the invention, the LED 14 is a RBG LED. In arrangements comprising more than one detector 20, 30, the RGB LED 14 may be configured to light up a first colour upon receipt by the transceiver of the wireless communication unit 13 of a fish bite or motion detection signal from a first paired detector, to light up second colour upon receipt by the transceiver of the wireless communication unit of a fish bite or motion detection signal from a second paired detector, and so on with each of the paired detectors being associated with a different colour of the RGB LED. In some arrangements, which colour of the RGB LED 14 is associated with each detector 20, 30 may be selectable. The at least one actuator 15 of the wireless communication unit 13 may be manipulable by the user to select which colour of the RGB LED 14 is associated with each detector 20, 30.

In preferred arrangements of the invention wherein the wireless communication unit 13 comprises an RGB LED 14, the at least one actuator 15 of the wireless communication unit may be manipulable by the user to enter a pairing mode of the wireless communication unit. The at least one actuator 15 of the wireless communication unit 13 may further be manipulable to illuminate the RGB LED 14 when the wireless communication unit is in the pairing mode. The user may select a colour of the RGB LED 14 for association with a detector 20, 30 by manipulation of the at least one actuator 15 of the wireless communication unit 13, wherein the selected colour for association is the colour of illumination of the RGB LED at the time of said manipulation of the at least one actuator. In a preferred arrangement, the user may cycle through the colours of illumination of the RGB LED 14, prior to the selection of a colour for association, by repeatedly manipulating the at least one actuator 15. Each manipulation of the at least one actuator 15 changes the colour of illumination of the RGB LED 14.

In arrangements of the invention wherein the transceiver of the or each detector 20, 30 is configured to transmit a pairing signal to the transceiver of the wireless communication unit 13 upon successful pairing, the RGB LED 14 may be configured to light up the selected colour associated with a detector upon receipt by the transceiver of the wireless communication unit of a pairing signal from the transceiver of said detector.

It can be appreciated that a RGB LED 14 is particularly advantageous in arrangements of the invention comprising a plurality of detectors 20, 30. The colour that the RGB LED 14 lights up indicates to the user of the wearable band 10 from which of the plurality of detectors 20, 30 a fish bite or motion detection signal has been received. The user is then aware of which of the plurality of detectors 20, 30 to check.

It can be appreciated that in arrangements of the invention comprising a plurality of detectors 20, 30 wherein the wireless communication unit 13 comprises an alarm, the alarm may be configured to produce a first sound upon receipt by the transceiver of the wireless communication unit of a fish bite or motion detection signal from a first paired detector, to produce a second sound upon receipt by the transceiver of the wireless communication unit of a fish bite or motion detection signal from a second paired detector, and so on with each of the paired detectors being associated with a different sound of the alarm. The at least one actuator 15 of the wireless communication unit 13 may be manipulable by the user to associate a different alarm sound with each of the plurality of detectors 20, 30.

In arrangements of the wireless communication unit 13 comprising a rechargeable battery, the RGB LED 14 may be configured to indicate the percentage charge of the battery. The at least one actuator 15 of the wireless communication unit 13 may be manipulable by the user to cause the RGB LED 14 to illuminate, wherein the colour of the lit RGB LED is determined by and indicative of the percentage charge of the battery.

In arrangements of the wireless communication unit comprising a rechargeable battery, the LED 14 may be configured to flash when the percentage charge of the battery falls below a certain percentage. In a preferred arrangement of the invention, the LED 14 is configured to flash when the percentage charge of the battery falls below 20% and more preferably when the percentage charge of the battery falls below 10%. It can be appreciated that the flashing of the LED 14 notifies the user of the wearable band 10 that they need to charge the rechargeable battery of the wireless communication unit 13. It can also be appreciated that an RGB LED is not required for indicating that the percentage charge of the battery has fallen below a certain value.

It can be appreciated that the wireless communication unit 13 may contain more than one LED 14. For example, the wireless communication unit 13 may comprise one LED 14 configured to indicate the percentage charge of the battery and a separate LED 14 configured to light up upon receipt by the transceiver of the wireless communication unit of a signal from a detector. It can also be appreciated that, in some embodiments, the wireless communication unit 13 may comprise an LED indicator unit comprising a plurality of different coloured LEDs in place of an RGB LED.

In a preferred arrangement of the invention, the transceiver of the wireless communication unit 13, the transceiver of the or each at least one detector 20, 30 and the transceiver of the head torch, if present, operate in the 433 MHz band.

In some arrangements, the wearable band 10 is water resistant. In a preferred arrangement, the wearable band 10 is water resistant with a liquid ingress protection (IP) level of 5 or higher. In some arrangements, the wearable band 10 is waterproof.

In arrangements of the invention wherein the wearable band 10 is a wristband, the wireless communication unit 13 preferably has dimensions of about 40 mm by about 15 mm by about 10 mm.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination, be utilised for realising the invention in diverse forms thereof.

The invention claimed is:

1. An angling system comprising a wearable band and at least two detectors selected from:
   at least one fish bite detector, wherein each fish bite detector comprises a fish bite sensor connected to a transceiver, and wherein each fish bite detector is configured to transmit a signal upon the fish bite sensor detecting a fish bite; and
   an anti-theft motion detector, wherein the anti-theft motion detector comprises a motion sensor connected to a transceiver, and wherein the anti-theft motion detector is configured to transmit a signal upon the motion sensor detecting motion,
   wherein the wearable band comprises:
   at least one strap; and
   a wireless communication unit, wherein the wireless communication unit is attached or attachable to the at least one strap, wherein the wireless communication unit comprises a transceiver, at least one actuator, and at least one of a haptic actuator connected to the transceiver and an alarm connected to the transceiver,
   wherein the transceiver of the wireless communication unit is pairable with the transceiver of each of the at least two detectors using the at least one actuator, wherein the transceiver of the wireless communication unit is configured to receive signals transmitted by each paired detector, and wherein reception of each signal causes the haptic actuator to vibrate and/or the alarm to sound.

2. The angling system of claim 1 further comprising a head torch, wherein the head torch comprises an illumination means connected to a transceiver, wherein the transceiver of the wireless communication unit is pairable with the transceiver of the head torch using the at least actuator, wherein, when the transceiver of the head torch and the transceiver of the wireless communication device are paired, the at least one actuator is manipulable by the user to cause an on/off signal to be transmitted from the transceiver of the wireless communication unit to the transceiver of the head torch, and wherein the receipt of an on/off signal from the wireless communication unit by the transceiver of the head torch causes the illumination means to be switched on or off.

3. The angling system of claim 1, wherein the wireless communication unit further comprises a LED connected to the transceiver and wherein the LED is configured to light up upon receipt by said transceiver of each signal transmitted by each paired detector.

4. The angling system of claim 3, wherein the LED is a RGB LED.

5. The angling system of claim 4 comprising more than one detector, wherein the RGB LED is configured to light up a first colour upon receipt by the transceiver of the wireless communication unit of signals from a first paired detector, wherein the RGB LED is configured to light up a second colour upon receipt by the transceiver of the wireless communication unit of signals from a second paired detector, and so on with each paired detector being associated with a different colour of the RGB LED.

6. The angling system of claim 5, wherein the at least one actuator is manipulable to select which colour of the RGB LED is associated with each paired detector.

7. The angling system of claim 4, wherein the wireless communication unit comprises a rechargeable battery, wherein the at least one actuator is manipulable to cause the RGB LED to illuminate, and wherein the colour of the RGB LED when lit is determined by and indicative of the percentage charge of the rechargeable battery.

8. The angling system of claim 3, wherein the wireless communication unit comprises a rechargeable battery, and wherein the LED is configured to flash when the percentage charge of the rechargeable battery falls below 20%.

9. The angling system of claim 3, wherein each of the at least two detectors and the head torch is configured to transmit a pairing signal to the transceiver of the wireless communication unit upon successful pairing with the transceiver of the wireless communication unit, and wherein the LED is configured to light up upon receipt by the transceiver of the wireless communication unit of the pairing signal.

10. The angling system of claim 1, wherein each of the at least two detectors and the head torch comprises at least one actuator manipulable by the user to pair the transceiver of the detector or the transceiver of the head torch with the transceiver of the wireless communication unit.

11. The angling system of claim 1, wherein the wearable band is a wristband.

12. The angling system of claim 1, wherein the at least one actuator of the wireless communication unit is configured for switching the wireless communication unit on and off.

13. The angling system of claim 1, wherein the wireless communication unit comprises a rechargeable battery connected to a charging port and preferably wherein the system further comprises a charger.

14. A method of pairing a wireless communication unit with at least two detectors selected from a fish bite detector and an anti-theft motion detector of an angling system, wherein the wireless communication unit comprises at least one actuator and a RGB LED and wherein each detector also comprises at least one actuator, comprising:
a) manipulating the at least one actuator of the wireless communication unit to enter a pairing mode of the wireless communication unit;
b) further manipulating the at least one actuator of the wireless communication unit to illuminate the RGB LED;
c) optionally, repeatedly manipulating the at least one actuator of the wireless communication unit to cycle through the colours of illumination of the RGB LED, wherein each manipulation of the at least one actuator of the wireless communication unit changes the colour of illumination of the RGB LED;
d) selecting a colour of the RGB LED for the RGB LED to illuminate upon receipt of a signal from a first of the at least two detectors association with the detector, wherein the selecting comprises manipulation of the at least one actuator of the wireless communication unit and wherein the selected colour is the colour of illumination of the RGB LED at the time of said manipulation of the at least one actuator of the wireless communication unit; and
e) manipulating the at least one actuator of the detector to complete pairing of the wireless communication unit with the first detector, wherein upon successful pairing the RGB LED illuminates, preferably wherein the RGB LED illuminates the selected colour; and
f) repeating steps a) to e) for each of the remaining at least two detectors.

15. A method of fish bite and/or motion detection comprising;
coupling at least two fish bite detectors comprising a transceiver to respectively at least two fishing lines, or coupling at least one fish bite detector comprising a transceiver to respectively at least one fishing line and placing an anti-theft motion detector comprising a transceiver in an area wherein the detection of motion is desired;
pairing the transceiver of each detector with a transceiver of a wireless communication unit of a wearable band using an at least one actuator of the wearable band, wherein the wireless communication unit comprises at least one of a haptic actuator and an alarm; and
detecting fish bites or fish bites and motions, wherein the transceiver of each fish bite detector transmits a signal to the transceiver of the wireless communication unit upon the fish bite detector detecting a fish bite and the transceiver of the anti-theft motion detector transmits a signal to the transceiver of the wireless communication unit upon the anti-theft motion detector detecting motion, and wherein the haptic actuator is configured to vibrate and/or the alarm is configured to sound upon reception by the transceiver of the wireless communication unit of each signal transmitted by each detector.

* * * * *